(12) United States Patent
Passe

(10) Patent No.: US 10,296,784 B2
(45) Date of Patent: *May 21, 2019

(54) VERIFYING PRESENCE OF A PERSON DURING AN ELECTRONIC VISITATION

(71) Applicant: Securus Technologies, Inc., Dallas, TX (US)

(72) Inventor: Scott Passe, Forney, TX (US)

(73) Assignee: Securus Technologies, Inc., Carrollton, TX (US)

(*) Notice: Subject to any disclaimer, the term of this patent is extended or adjusted under 35 U.S.C. 154(b) by 327 days.

This patent is subject to a terminal disclaimer.

(21) Appl. No.: 14/683,655

(22) Filed: Apr. 10, 2015

(65) Prior Publication Data

US 2015/0213304 A1 Jul. 30, 2015

Related U.S. Application Data

(63) Continuation-in-part of application No. 14/152,831, filed on Jan. 10, 2014, now Pat. No. 9,007,420.

(51) Int. Cl.
| | |
|---|---|
| *H04M 7/14* | (2006.01) |
| *H04M 1/56* | (2006.01) |
| *G06K 9/00* | (2006.01) |
| *H04N 7/14* | (2006.01) |
| *H04M 3/42* | (2006.01) |
| *H04M 3/22* | (2006.01) |

(52) U.S. Cl.
CPC .... *G06K 9/00255* (2013.01); *H04M 3/42059* (2013.01); *H04N 7/141* (2013.01); *H04M 3/2281* (2013.01); *H04M 2203/6054* (2013.01)

(58) Field of Classification Search
CPC ............ H04N 7/15; H04N 7/147; H04N 7/14; H04N 7/157; H04N 7/141; H04N 7/142; H04N 7/152
USPC ............ 348/14.01, 14.08, 14.09; 379/142.05
See application file for complete search history.

(56) References Cited

U.S. PATENT DOCUMENTS

| | | | |
|---|---|---|---|
| 6,219,640 B1 | 4/2001 | Basu et al. | |
| 7,436,988 B2 | 10/2008 | Zhang et al. | |

(Continued)

OTHER PUBLICATIONS

E. Hjelmås et al., "Face detection: A Survey," Computer Vision and Image Understanding, Sep. 2001, pp. 236-274, vol. 83, No. 3.

(Continued)

*Primary Examiner* — Quoc D Tran
(74) *Attorney, Agent, or Firm* — Fogarty LLP

(57) ABSTRACT

Images of residents of a controlled-environment facility may be captured at the time of intake into the facility. A feature detection process may be performed on each image to verify that corporeal facial features are present in each resident image and a copy of such an image of each resident may be saved. A request to initiate an electronic visitation session may be received and an image of a user is captured. A feature detection process is performed on the captured image to verify that images of features of a corporeal human face are present in the captured image, determining whether an image of a corporeal human face is present in the captured image. The electronic visitation session may then be connected in response to a determination that an image of a corporeal human face is present. Further, a facial recognition process may also be performed on the captured image.

27 Claims, 6 Drawing Sheets

(56) References Cited

U.S. PATENT DOCUMENTS

| | | | |
|---|---|---|---|
| 8,218,829 B2 | 7/2012 | Kenoyer | |
| 9,007,420 B1* | 4/2015 | Passe | H04M 3/42059 348/14.01 |
| 9,064,257 B2 | 6/2015 | Beigi | |
| 2006/0064324 A1 | 3/2006 | Rosenfeld et al. | |
| 2006/0087555 A1 | 4/2006 | Boyd et al. | |
| 2008/0000966 A1* | 1/2008 | Keiser | G06Q 10/10 235/382 |
| 2008/0201158 A1 | 8/2008 | Johnson et al. | |
| 2012/0019620 A1* | 1/2012 | Lee | G06K 9/00255 348/46 |
| 2012/0262271 A1* | 10/2012 | Torgersrud | G06F 21/32 340/5.53 |
| 2012/0281058 A1* | 11/2012 | Laney | H04N 7/147 348/14.03 |
| 2013/0194377 A1 | 8/2013 | Humphries | |
| 2014/0279789 A1* | 9/2014 | Torgersrud | G06Q 10/10 706/46 |

OTHER PUBLICATIONS

M. Yang et al., "Detecting Faces in Images: A Survey," IEEE Transactions on Pattern Analysis and Machine Intelligence, Jan. 2002, pp. 34-58, vol. 24, No. 1.

C. Zhang et al., "A Survey of Recent Advances in Face Detection," Microsoft Research Technical Report No. MSR-TR-2010-66, 2010, Microsoft Corporation.

M. Kirby et al., "Application of the Karhunen-Loeve Procedure for the Characterization of Human Faces,", IEEE Transactions on Pattern Analysis and Machine Intelligence, Jan. 1990, pp. 103-108., vol. 12, No. 1.

M. Turk et al., "Eigenfaces for Recognition," Journal of Cognitive Neuroscience, 1991, pp. 71-86, vol. 3, No. 1.

J. Cartoux et al., "Face Authentication or Recognition by Profile Extraction from Range Images," IEEE Proceedings of the Workshop on Interpretation of 3D Scenes, Nov. 1989, pp. 194-99.

K. Bowyer et al., "A survey of approaches and challenges in 3D and multi-modal 3D+2D face recognition," Computer Vision and Image Understanding, 2006, pp. 1-15, vol. 101, No. 1.

P. Viola et al., "Rapid Object Detection Using a Boosted Cascade of Simple Features," Computer Vision and Pattern Recognition, 2001.

L. Sanchez Lopez, "Local Binary Patterns Applied to Face Detection and Face Recognition," Final Research Project, Universitat Politecnica de Catalunya, Nov. 2010.

Y. H. Huang et al., "Face Detection and Smile Detection," Proceedings of IPPR Conference on Computer Vision, Graphics, and Image Processing, Shitou, Taiwan, A5-6, 2009.

M. Felsberg, "Robot Vision Systems, PhD course spring term 2015," Computer Vision Laboratory PowerPoint Presentation, 2015.

Global TelLink Corporation, "Petition for Inter Partes Review of U.S. Pat. No. 9,007,420," filed Jun. 17, 2016, 68 pages.

Beigi, Homayoon, "Declaration of Dr. Homayoon Beigi in Support of Petition for Inter Partes Review of U.S. Pat. No. 9,007,420," Jun. 17, 2016, 124 pages.

* cited by examiner

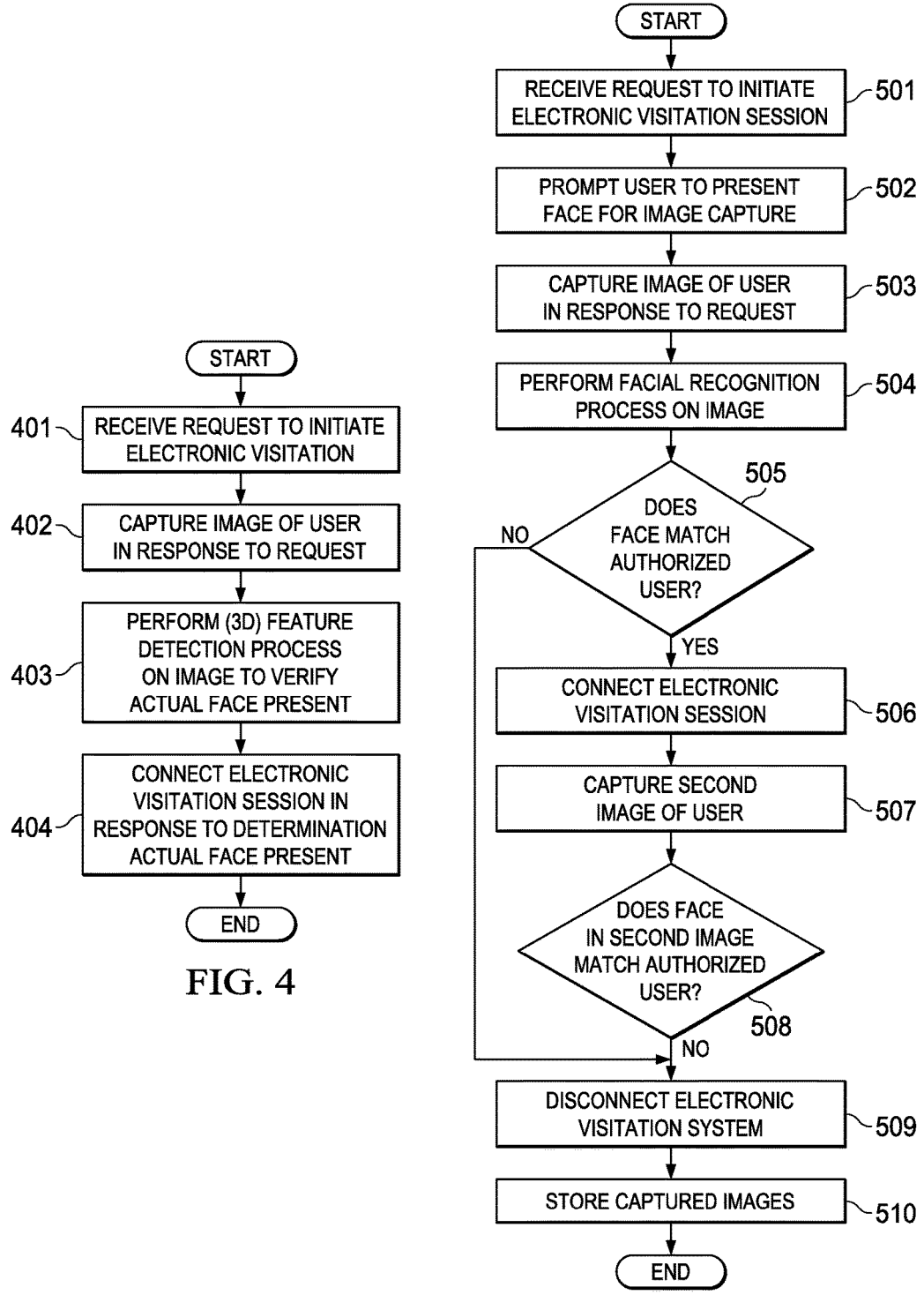

VERIFYING PRESENCE OF A PERSON DURING AN ELECTRONIC VISITATION

CROSS-REFERENCE TO RELATED APPLICATION

This is a continuation-in-part of U.S. patent application Ser. No. 14/152,831, entitled Verifying Presence of Authorized Persons During an Electronic Visitation, filed Jan. 10, 2014, which is incorporated herein by reference.

TECHNICAL FIELD

Embodiments of the present invention are directed, in general, to interactive computing devices, more specifically to methods and systems for verifying the presence of an actual person during an electronic visitation, and in particular embodiments, to methods and systems for verifying the presence of an authorized person or persons during an electronic visitation.

BACKGROUND

Controlled-environment facilities, such as correctional facilities provide various options for visitation with residents (inmates). Options include in-person visitation, room-to-room visitation through a divider, telephone visitation, and video visitation. Residents of controlled-environment facilities are typically restricted to receiving visitation from approved persons.

When an individual visits an inmate in person, the individual's identity may be determined by providing identification documents to staff of the controlled-environment facility for verification. The identification documents may include a picture of the individual. The staff member may cross-reference the individual's name with a list of individuals on the inmate's approved visitor list.

Identification of visitors is more difficult with telephone or video visitation. The individual may provide a personal identification number, phrase, or pass code, but it is often difficult to ascertain whether the person providing the identifying information is in fact the authorized visitor without visual confirmation of the person's identity. For example, an authorized visitor may pass identification information to unauthorized individuals so that they may pose as an authorized visitor for the electronic visitation. Moreover, it may be difficult to confirm that an actual person is taking part in a video visitation.

SUMMARY

Embodiments of the present invention are directed to methods, apparatuses, and systems, which verify the presence of a person, or persons, during an electronic visitation. In one embodiment, a method may include receiving a request to initiate an electronic visitation session and capturing an image, with an image capture device, of a user to provide a captured image in response to the request. The image capture device may be a component of a video visitation system located within a controlled-environment facility, and/or a component of an electronic device located outside of the controlled-environment facility. The user may be prompted to face the image capture device in response to receiving the request in accordance with some embodiments, and/or the image capture device may be configured to capture a still-frame image and/or a video frame to provide the captured image of the user in accordance with various embodiments. This captured image may be stored in a data storage device. A feature detection process may be performed, with a processor, on the captured image, to verify that images of features of a corporeal human face are present in the captured image to thereby determine whether an image of a corporeal human face is present in the captured image. This feature detection process may utilize three-dimensional (3D) feature detection process. The electronic visitation session may be connected in response to a determination that an image of a corporeal human face is present in the captured image. Various embodiments may call for performing a responsive action in response to a determination that an image of a corporeal human face is not present in the captured image. Further embodiments may include preforming a facial recognition process on the captured image, following performance of the feature detection process and/or in response to a determination that an image of a corporeal human face is present in the captured image, to identify the user and/or to confirm an identity of the user.

Hence, an embodiment of a video visitation system or apparatus may include an image capture device configured to capture an image of a user, to provide a captured image of the user, such as in response to a request to initiate an electronic visitation session, and a processing device coupled to the image capture device. This processing device may be configured to perform a feature detection process on the captured image, to detect images of corporeal human face features present in the captured image, to thereby verify that an image of a corporeal human face is present in the captured image. The processing device may be further configured to connect the electronic visitation session in response to verification that that an image of a corporeal human face is present in the captured image.

In accordance with some embodiments the processing device initiates a responsive action in response to a failure to verify that an image of a corporeal human face is present in the captured image. In various embodiments the image capture device may be a component of a video visitation system located within a controlled-environment facility and/or an image capture device may be a component of an electronic device located outside of the controlled-environment facility. The processing device, in some embodiments may be further configured to prompt the user to face the image capture device in response to receiving the request, and/or the image capture device may be further configured to capture a still-frame image and/or a video frame to provide the captured image of the user. The processing device may also be configured to store the captured image in a data storage device. The processing device may utilize a 3D feature detection process to carry out the feature detection process. Further, the processing device may be configured to perform a facial recognition process on the captured image, following performance of the feature detection process and/or in response to a failure to verify that an image of a corporeal human face is present in the captured image, to identify the user and/or to confirm an identity of the user.

Additionally or alternatively, an embodiment of a computer implemented method for verifying presence of authorized person(s) during an electronic visitation may include capturing images of residents of a controlled-environment facility at the time of intake or registration of the residents into the controlled-environment facility. A feature detection process may be performed on each of the images of each of the residents to verify that face detection-useable and/or facial recognition-usable images of corporeal facial features are present in each of the images of each of the residents. Whereupon, a copy of each image of each resident in which face detection-useable and/or facial recognition-usable images of corporeal facial features are present may be stored to a data storage device in response to verification that images of corporeal facial features were present.

Thereafter, a request to initiate an electronic visitation session by a user may be received and user identification information may be received from the user. Thereupon, an image of the user may be captured, with an image capture device, such as in response to the request, to thereby provide a captured user image. A facial recognition process may be performed on the captured user image to identify the user. In accordance with some embodiments, the user may be a resident of the controlled-environment facility and a saved copy of an image of the resident, in which face detection-useable and/or facial recognition-usable images of corporeal facial features are present, may be used in performing a facial recognition process on the captured user image to identify the resident. This saved copy of the image of the resident may be one saved in response to verification that images of corporeal facial features were present at the time of intake or registration, such as discussed above.

In some embodiments the user may be a non-resident of the controlled-environment facility. In some such embodiments, an image of the non-resident may be captured to provide a captured image of the non-resident. Whereupon, a feature detection process may be performed on the captured image of the non-resident to verify that images of features of a corporeal human face are present in the captured image, so as to determine whether an image of a corporeal human face is present in the captured image of the non-resident. Additionally or alternatively, a facial recognition process may be performed on the captured image of the non-resident to identify the non-resident.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, a system may include at least one processor and memory coupled to the at least one processor, the memory configured to store program instructions executable by the at least one processor to cause the system to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
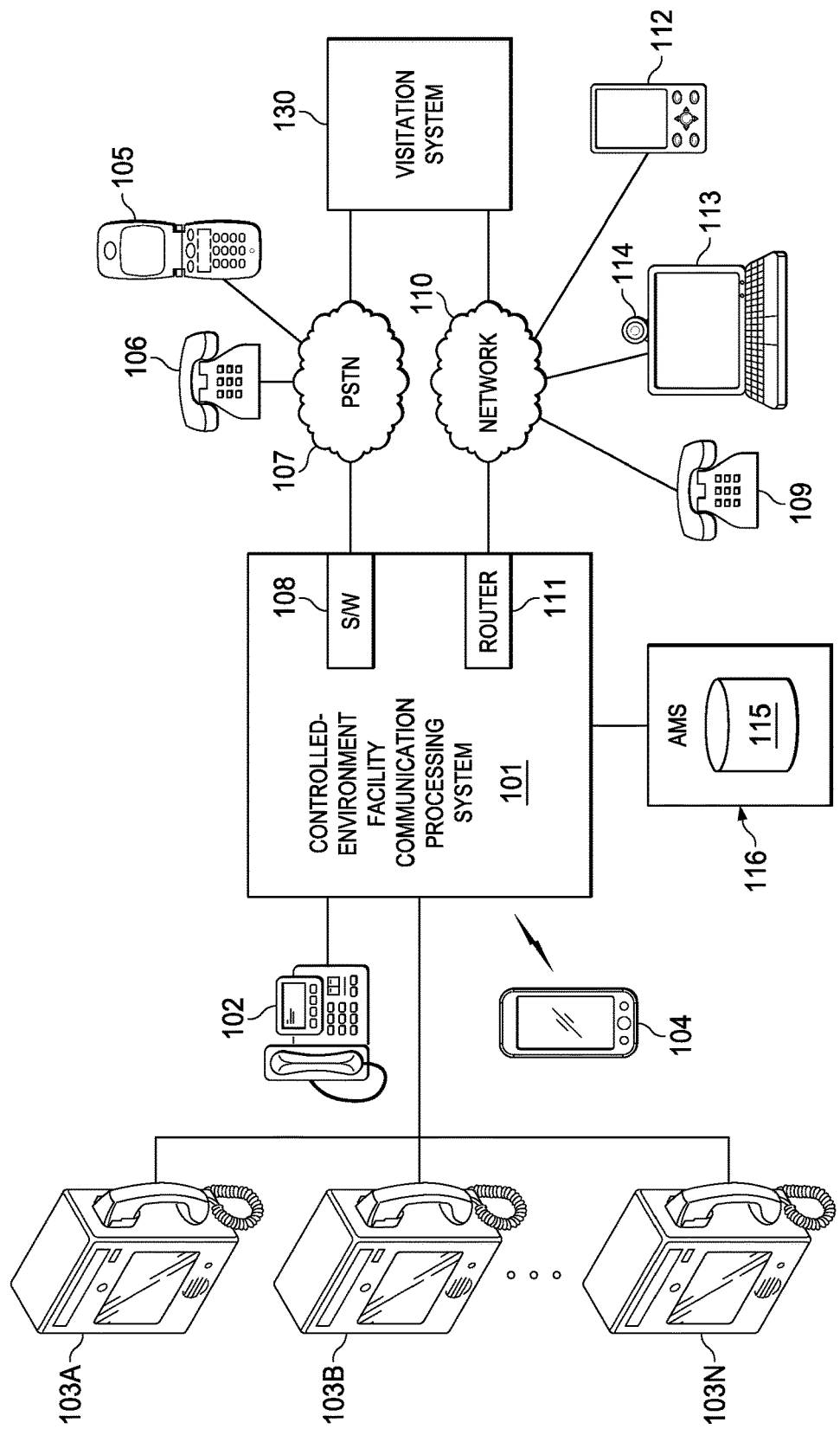

Having thus described the invention in general terms, reference will now be made to the accompanying drawings, which are not necessarily drawn to scale, and wherein:

FIG. 1 is a schematic block diagram illustrating one embodiment of an example system for verifying presence of a person and/or authorized person(s) during an electronic visitation.

Figure 2:
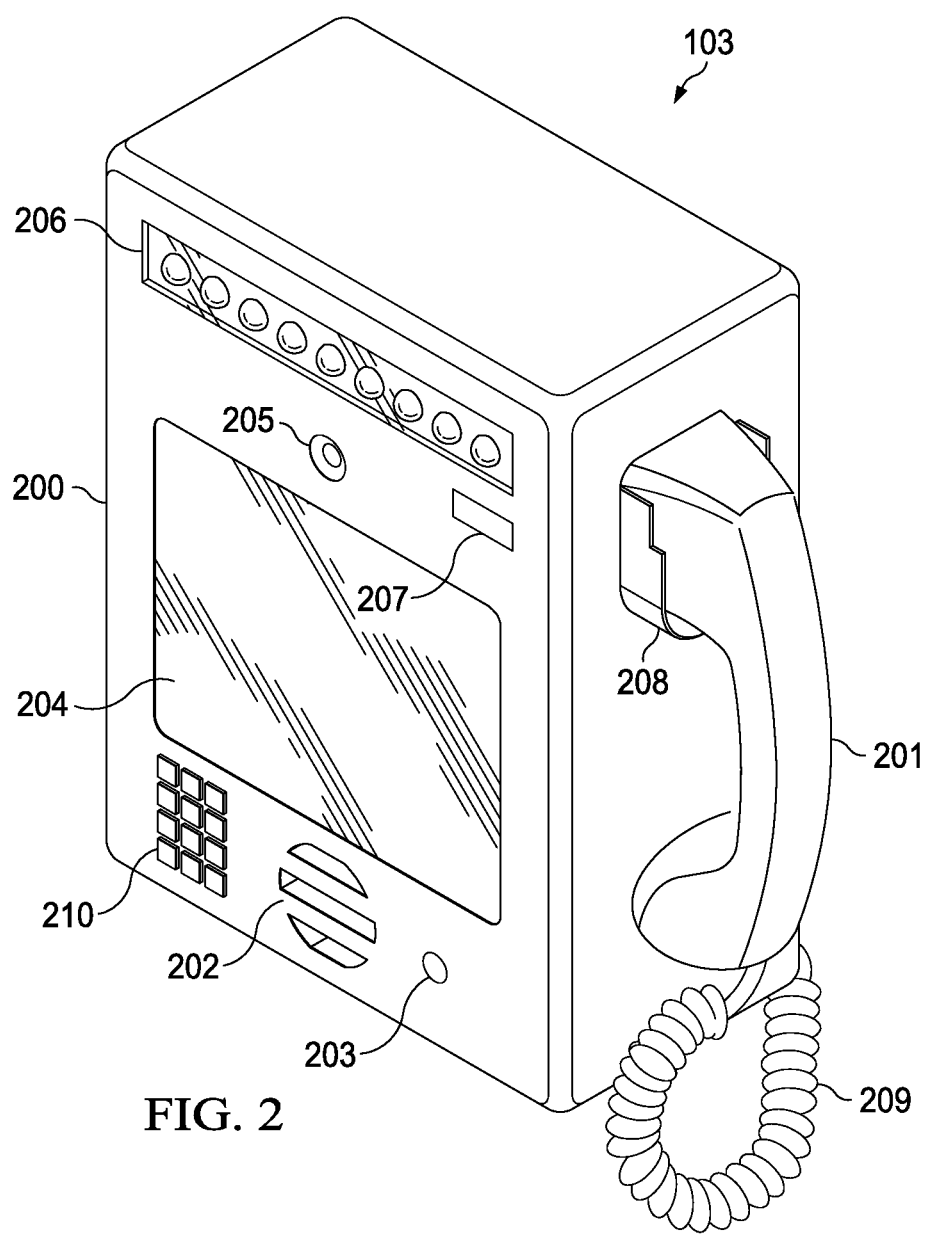

FIG. 2 is a schematic block diagram illustrating one embodiment of an example apparatus for verifying presence of a person and/or authorized person(s) during an electronic visitation.

Figure 3:
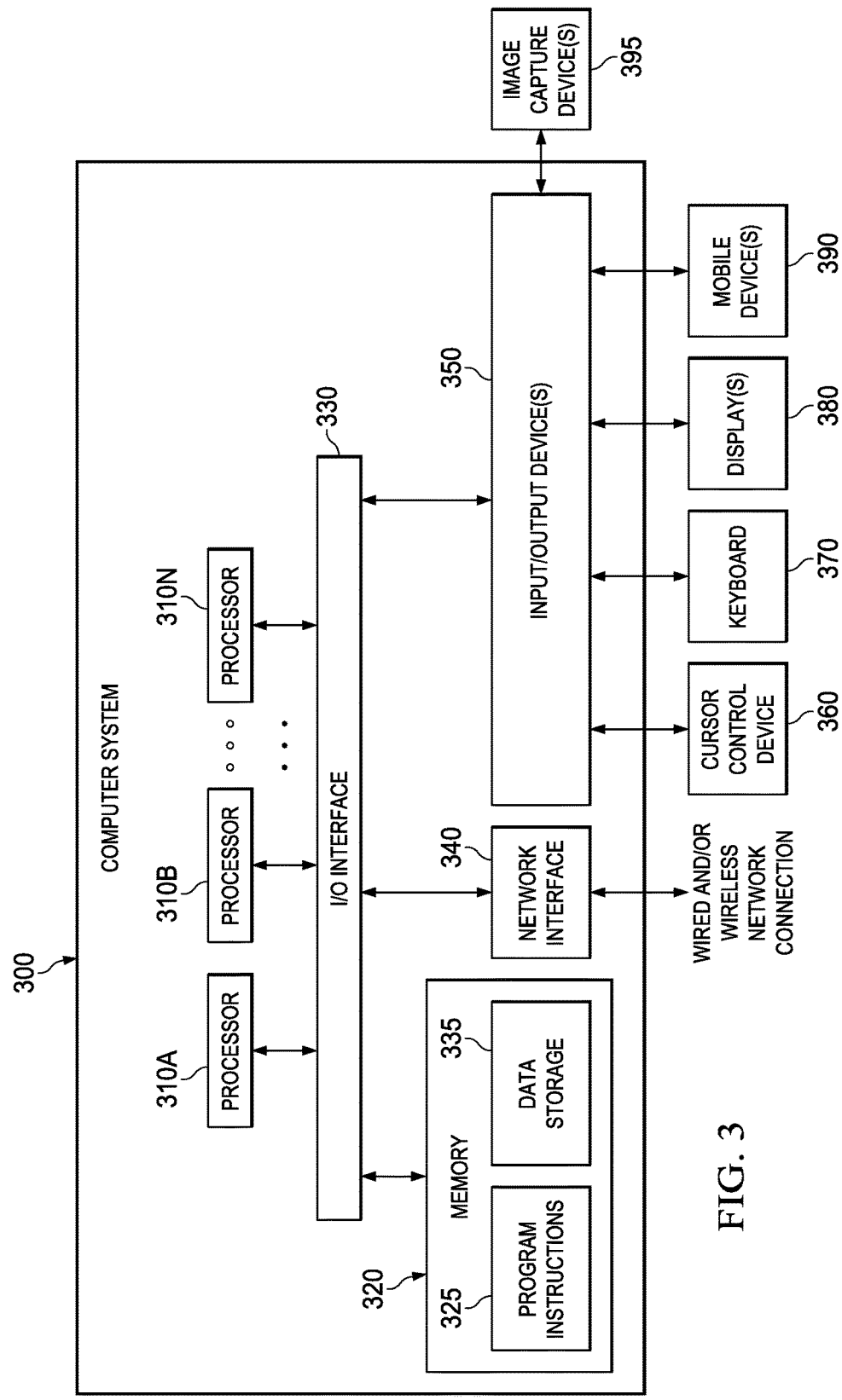

FIG. 3 is a schematic block diagram illustrating one embodiment of an example processing device configurable as an apparatus for verifying presence of a person and/or authorized person(s) during video visitation, in accordance with some embodiments.

FIG. 4 is a schematic flowchart diagram illustrating one embodiment of a method for verifying presence of a person during an electronic visitation.

FIG. 5 is a schematic flowchart diagram illustrating an embodiment of a method for verifying authorized person(s) during an electronic visitation.

Figure 6:
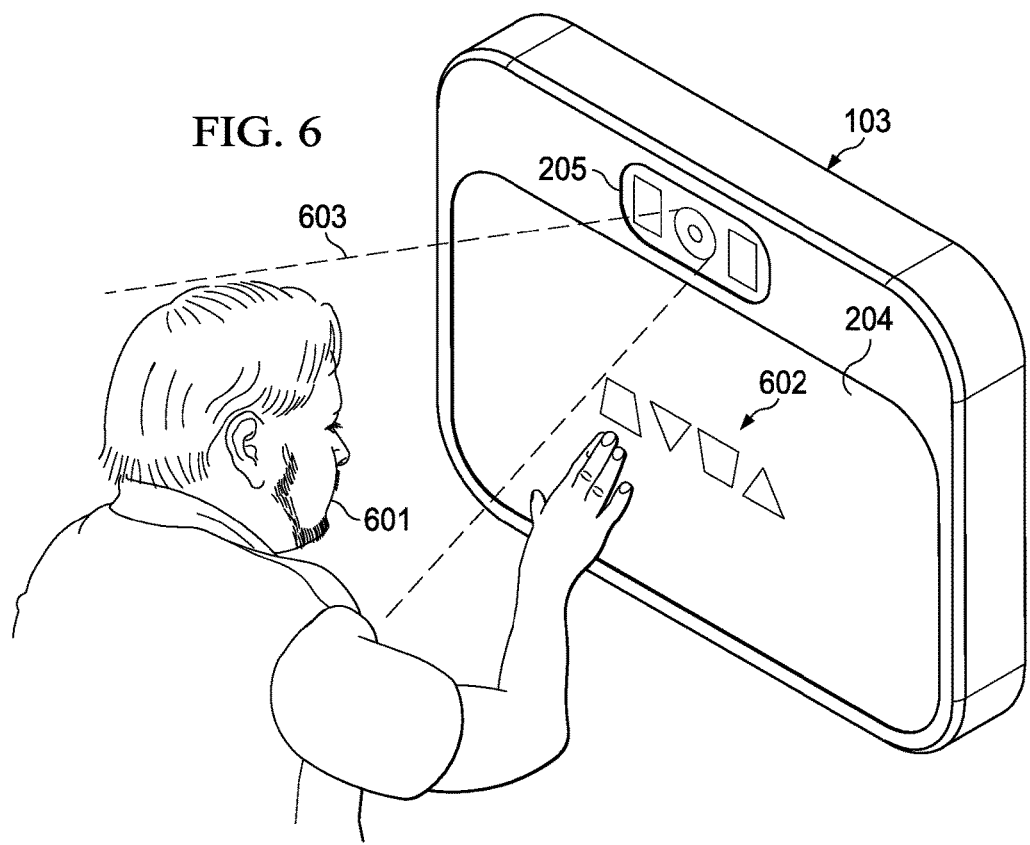

FIG. 6 is a mockup diagram illustrating one embodiment of an apparatus for verifying presence of a person and/or authorized person(s) during an electronic visitation during use.

Figure 7:
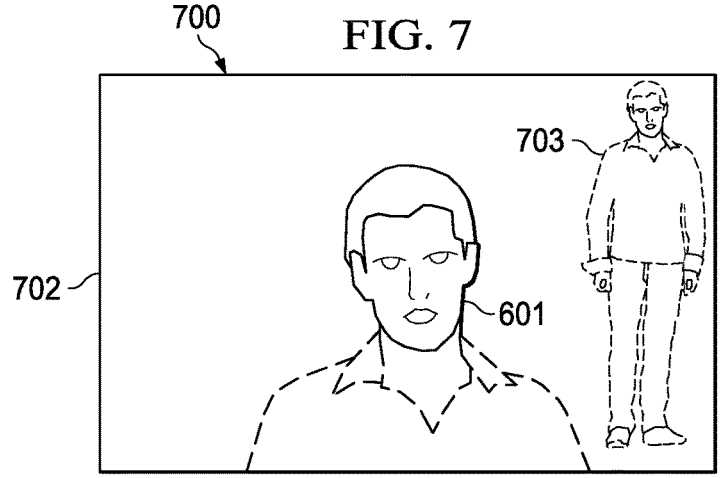

FIG. 7 is a mockup diagram illustrating one embodiment of an example image frame captured by an example image capture device.

Figure 8:
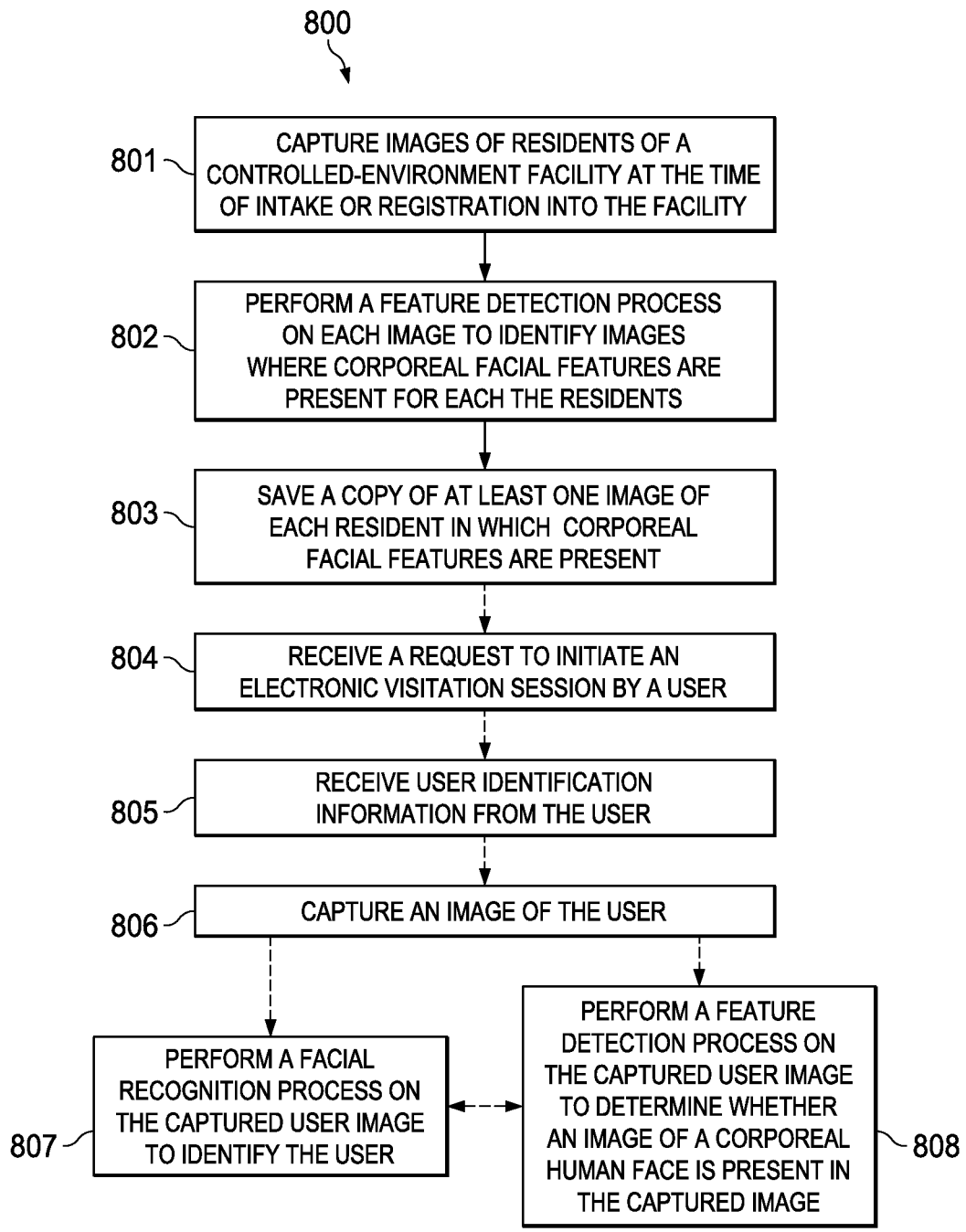

FIG. 8 is a flowchart of another embodiment of a process for verifying presence of a person and/or authorized person(s) during an electronic visitation.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

This specification discloses methods and systems for verifying the presence of one or more actual and/or authorized persons during an electronic visitation. The various techniques described herein may find applicability in a wide variety of controlled-environment facilities (as well as outside of controlled-environment facilities). Various types of controlled-environment facilities are present in today's society, and persons may be voluntary or involuntary residents of such facilities, whether temporarily or permanently. Examples of controlled-environment facilities may include correctional institutions or facilities (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation clinics, such as drug and alcohol rehabilitation facilities, etc.), restricted living quarters (e.g., hotels, resorts, camps, dormitories, barracks, etc.), and the like.

For convenience of explanation, various examples discussed herein are presented in the context of correctional facilities. For instance, in some of the embodiments discussed below, a controlled-environment facility may be referred to as a jail or prison, and its residents may be referred to as residents, arrestees, detainees, or inmates. It should be understood, however, that the systems and methods described herein may be similarly applicable to other types of controlled-environment facilities and their respective residents (e.g., a hospital and its patients). Other embodiments may be suitable for use in other public places, for example at ATM devices or at airport check-in kiosks.

As noted, embodiments of the present invention are directed, in general to interactive computing devices, more specifically to methods and systems for verifying the presence of an actual person during an electronic visitation, and in particular embodiments to methods and systems for verifying the presence of an authorized person or persons during an electronic visitation. In accordance with embodiments of the present systems and methods, images of residents of a controlled-environment facility may be captured at the time of intake into the facility. A feature detection process may be performed on each image to verify that corporeal facial features are present in each resident image and a copy of such an image of each resident may be saved. Sometime thereafter, and/or in other embodiments, a request to initiate an electronic visitation session may be received and an image of a user is captured. A feature detection process may be performed on the captured image to verify that images of features of a corporeal human face are present in the captured image, determining whether an image of a corporeal human face is present in the captured image. The electronic visitation session may then be connected in response to a determination that an image of a corporeal human face is present. In accordance with these and/or further embodiments, a facial recognition process may also be performed on the captured image, such as through use of the saved resident intake image.

Hence, embodiments of the present systems and methods may make use of "face detection" processes, and/or further or various other embodiments may make use of "facial recognition" processes. Face detection is a computer technology that identifies human faces in digital images. Face detection can be regarded as a specific case of object-class detection. In object-class detection, the task is to find the locations and sizes of all objects in an image that belong to a given class. Face detection algorithms focus on the detection of frontal human faces. Face detection is used in biometrics, often as a part of, or together with, a facial recognition system. Hence, face detection may be used to detect human faces, which might then be used for recognizing a particular face in a facial recognition process. However, such face detection may be used alone, without the use of facial recognition, in fields such as video surveillance, human computer interface, image database management, and/or in accordance with various embodiments of the present systems and methods. Face detection may be a fast, less computational-intensive process, which may be performed by a small local computer system, without the need to necessarily access databases, more powerful computational resources, or the like, which may be necessary for facial recognition.

Turning now to FIG. 1, a block diagram of an illustrative environment where verifying presence of a person and/or authorized persons during an electronic visitation may be employed is depicted according to some embodiments. As shown, communication processing system 101 may provide telephone services, videoconferencing, online chat, and other communication services to a controlled-environment facility. For example, in some cases, communication system 101 may be co-located with a controlled-environment facility. Alternatively, communication system 101 may be centrally or remotely located with respect to one or more controlled-environment facilities and/or may provide communication services to multiple controlled-environment facilities. More generally, however, it should be noted that communication system 101 may assume a variety of forms, and may be configured to serve a variety of facilities and/or users, whether within or outside of a controlled-environment facility.

In the context of a correctional facility, for instance, inmates may use telephones 102 to access certain communication services. In some facilities, inmates may also use a personal computer wireless device 104 to access such services. For example, an inmate may initiate telephone services by lifting the receiver on telephone 102, at which time the inmate may be prompted to provide a personal identification number (PIN), other identifying information or biometrics. An interactive voice response (IVR) unit (not shown) may generate and play prompt or other messages to inmates on devices 102 through 104.

Under the control of communication processing system 101, devices 102, 103 and 104 may be capable of connecting to a non-resident's (i.e., a person not committed to a controlled-environment facility) device 105 or telephone 106 across a publicly switched telephone network (PSTN) 107. For example, device 105 may be a mobile phone, whereas telephone 106 may be located at a non-resident's home, inmate visitation center, etc. Switch 108 in communication processing system 101 may be used to connect calls across PSTN 107. Additionally or alternatively, the non-resident may be at telephone 109 or device 112, which is on Voice-over-IP (VoIP), or packet data network 110, such as, for example the Internet. Router 111 of communication system 101 is used to route data packets associated with a call connection to destination telephone 109 or device 112.

Intelligent facility devices 103a-n (each collectively referred to as "Intelligent facility device 103") may have video conferencing capabilities to enable residents to participate in video visitation sessions with non-residents of the controlled-environment facility via video call, secure online chat, etc. In one embodiment, intelligent facility devices 103 may include touch-screen devices. In some embodiments, intelligent facility devices 103 may include an image capture device, such as a webcam. For example, a non-resident party may have a personal or laptop computer 113 with camera 114 (or a cell phone, tablet computer, etc.). Additionally or alternatively, device 112 may have an integrated camera and touch-screen display (e.g., a smart phone, tablet, etc.). A network connection between the parties may be established and supported by an organization or commercial service that provides computer services and software for use in telecommunications and/or VOIP, such as SKYPE®. Additionally or alternatively, the correctional facility and/or the destination may use videoconferencing equipment compatible with ITU H.323, H.320, H.264, and/or V.80, or other suitable standards. Generally speaking, each intelligent facility device 103 may be disposed in a visitation room, in a pod, kiosk, etc.

In addition to providing certain visitation and communication operations, communication processing system 101 may attempt to ensure that a resident's calls, video conferences, online chats, etc. are performed only with non-residents whose identities, devices, email addresses, phone numbers, etc. are listed in that resident's Pre-Approved Contact (PAC) list. Each resident's PAC list may be stored, for example, in database 115 maintained by Administration and Management System (AMS) 116. In addition to PAC list(s), AMS 116 may also store inmate or resident profile data (RPD), as well as resident financial data, such as commissary accounts.

As an example, in the context of a correctional facility, database 115 may include information such as balances for inmate trust and calling accounts; trial schedule; conviction data; criminal record; sentencing data, such as time served, time remaining to be served, and release date; cell and cellmate assignments; inmate restrictions and warnings; commissary order history; telephone call history; call recordings; known or suspected gang or criminal affiliations; known or suspected affiliates, accomplices, or gang members; and any other information that may be relevant or useful to correctional facility staff to house and maintain inmates.

Visitation system 130 may be configured to provide, schedule, and manage visitation services to residents and non-residents of a controlled-environment facility. To that end, visitation system 130 may be coupled to PSTN 107 and/or network 110 in a manner similar to communication processing system 101 by also including one or more gateways, switches and/or routers (not shown). Accordingly, visitation system 130 may be configured to communicate with one or more residents of the controlled-environment facility via devices 102-104 and with one or more non-residents via devices 105, 106, 109, 112, and/or 113. Although visitation system 130 is shown in FIG. 1 as being remotely located with respect to communication processing system 101 (and the controlled-environment facility), in other cases visitation system 130 may be co-located with the facility and/or integrated within system 101.

In some implementations, communication system 101 may be configured to perform video visitation monitoring operations configured to monitor and or record video visitations (e.g., as electronic video files). In scenarios where communication system 101 is located within the controlled-environment facility, it may have direct access to AMS 116. In other embodiments, however, communication system 101 may be located remotely with respect to the controlled-environment facility, and access to AMS 116 may be obtained via a computer network such as, for example, network 110.

In some embodiments, intelligent facility devices 103 may be implemented as a computer-based system. For example, each of intelligent facility devices 103 may include a display, camera, and handset. The display may be any suitable electronic display such as, for example, a Liquid Crystal Display (LCD), a touchscreen display (e.g., resistive, capacitive, etc.), or the like, whereas the camera may be a suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone).

During a video visitation session, intelligent facility devices 103 may be configured to capture a video image of a resident to be transmitted to a non-resident using the camera, and to display a video image of the non-resident to the resident using the display. Intelligent facility devices 103 may also be configured to capture an audio signal from the resident to be transmitted to a non-resident using the mouthpiece portion of the handset, and to provide an audio signal from the non-resident to the resident using the earpiece portion of the handset. Additionally or alternatively, audio received from the non-resident may be reproduced via a loudspeaker, and audio provided by the resident may be captured via a microphone.

In addition to video visitation, intelligent facility devices 103 may also be used by the resident to access a resident portal, which allows access to communication processing system 101. The access available to the resident through the resident portal may be limited or restricted according to the resident's permissions on the system 101. In some embodiments, the resident may be able to access his/her personal account information, make purchases, check electronic communications such as email, and the like.

In some cases, intelligent facility devices 103 may assume the form of any computer, tablet computer, smart phone, etc., or any other consumer device or appliance with videoconferencing capabilities.

FIG. 2 is a diagram of a video visitation device, such as an intelligent facility device 103. In some embodiments, device 103 may be implemented as a computer-based system such as described in connection with FIG. 3. As illustrated, device 103 includes display 204, camera 205, and handset 201 coupled to device 103 via wire 209. Display 204 may be any suitable electronic display such as, for example, a Liquid Crystal Display (LCD), a touchscreen display (e.g., resistive, capacitive, etc.), or the like, whereas camera 205 may be any suitable imaging device such as, for instance, a video camera or webcam equipped with Charge-Coupled Devices (CCDs), Complementary Metal-Oxide-Semiconductor (CMOS) active pixel sensors, etc. Handset 201 may be similar to a traditional telephone handset including an earpiece portion (with a speaker), a handle portion, and a mouthpiece portion (with a microphone).

During a video visitation session, video visitation device 103 may be configured to capture a video image of a resident to be transmitted to a non-resident using camera 205, and to display a video image of the non-resident to the resident using display 204. Video visitation device 103 may also be configured to capture an audio signal from the resident to be transmitted to the non-resident using the mouthpiece portion of handset 201, and to provide an audio signal from the non-resident to the resident using the earpiece portion of handset 201. Additionally or alternatively, audio received from the non-resident may be reproduced via loudspeaker 202, and audio provided by the resident may be captured via microphone 203. In some embodiments, handset holder or holster 208 may be configured to allow a user to securely rest handset 201 against device 103 (e.g., in an "off" position) when device 103 is not in use. Furthermore, handset holder 208 may include a mechanical or electromechanical switch or sensor (not shown) that senses when handset 201 is not resting against it (e.g. in its "on" position).

Video visitation device 103 may also include lighting device 206 and lighting sensor 207. In some embodiments, lighting device 206 may include one or more incandescent light sources (e.g., bulbs, lamps, etc.), fluorescent lamps, Compact Fluorescent Lamps (CFL), Cold Cathode Fluorescent Lamps (CCFL), high-intensity discharge sources, Light-Emitting Diodes (LEDs), or the like. Additionally or alternatively, lighting device 206 may include one or more adjustable lighting devices with variable intensity, brightness, luminance, color, tone, etc. For example, in certain embodiments, lighting device 206 may include an infrared (IR) light source (e.g. IR LED(s)), which may be used as a covert means to provide light to capture an image of a resident and/or the surroundings, such as without the resident or other around knowing the image is being captured. Lighting or light sensor 207 may include one or more suitable sensors such as, for example, photoresistors, photodiodes, etc. In various implementations, camera 205 may serve as light sensor, and a (separate) light sensor may be absent.

Furthermore, it should be noted that video visitation device 103 may assume the form of any computer, tablet computer, smart phone, etc., or any other consumer device or appliance with videoconferencing capabilities. For example, in the case where video visitation device 103 is a camera-enabled television (or smart phone, etc.) that does not include a dedicated lightning apparatus, the brightness of display 204 may be adjusted so that display 204 may itself act as lighting device 206 (e.g., the brightness of display 204 may be increased to also increase the illumination of the person(s) "watching" the teleconference through the television, for example, upon detection that a video connection has been established).

In the context of correctional facilities or the like, video visitation device 103 may include one or more tampering/impact resistant or hardened elements configured to protect them from vandalism or otherwise destructive acts. For example, one or more of devices 202-207 may be protected by a transparent plastic or thermoplastic (e.g., Plexiglas, etc.) material.

In one embodiment, the video visitation device 103 may include a keypad 210 or other user input device to allow a user to enter information. For example, the user may dial a telephone number associated with a recipient of a video visitation call, enter an account number for billing purposes, or enter a Personal Identification Number (PIN), inmate number, or the like, for authentication and/or identification purposes.

FIG. 3 is a schematic block diagram illustrating one embodiment of a processing device configurable for use according to the present embodiments. In various embodiments, system 300 may be a server, a workstation, a kiosk, an intelligent facility device, a desktop computer, a laptop, a tablet computer, a mobile device, a smart phone, or the like. In some cases, system 300 may be used to implement various ones of controlled-environment facility communication processing system 101, intelligent facility devise 103, AMS 116, visitation system 130, and/or the like.

As illustrated, computer system 300 includes one or more processors 310A-N coupled to a system memory 320 via an input/output (I/O) interface 330. Computer system 300 further includes a network interface 340 coupled to I/O interface 330, and one or more input/output devices 350, such as cursor control device 360, keyboard 370, display(s) 380, or mobile device(s) 390. In an embodiment, I/O interface 330 may include a touch-sensitive screen. Other devices may include, for example, image capture devices 395, surveillance cameras, microphones, antennas/wireless transducers, phone detection modules, etc. In some embodiments, each of visitation system 130, AMS 116, communication processing system 101, devices 102 through 104, and/or devices 105, 106, 109, 112, and 113 may be implemented using a single instance of computer system 300, while in other embodiments multiple such systems, or multiple nodes making up computer system 300, may be configured to host different portions of a given electronic device or system.

In various embodiments, computer system 300 may be a single-processor system including one processor 310, or a multi-processor system including two or more processors 310 (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or other dedicated graphics-rendering device.

System memory 320 may be configured to store program instructions and/or data accessible by processor 310. In various embodiments, system memory 320 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described below in connection with FIGS. 4-7, may be stored within system memory 320 as program instructions 325 and data storage 335, respectively. In other embodiments, program instructions and/or data may be received, sent or stored upon different types of computer-accessible media or on similar media separate from system memory 320 or computer system 300.

Generally speaking, a computer-accessible medium may include any tangible or non-transitory storage media or memory media such as electronic, magnetic, or optical media—e.g., disk or CD/DVD-ROM coupled to computer system 300 via I/O interface 330. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any necessary protocol, timing or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. In addition, in some embodiments some or all of the functionality of I/O interface 330, such as an interface to system memory 320, may be incorporated directly into processor 310.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre-Channel SANs, or via any other suitable type of network and/or protocol.

Input/output devices 350 may, in some embodiments, include one or more display terminals, keyboards, keypads, touchpads, touch screens, scanning devices, voice or optical recognition devices, mobile devices, or any other devices suitable for entering or retrieving data by one or more computer system 300. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

As shown in FIG. 3, memory 320 may include program instructions 325, configured to implement certain embodiments described herein, and data storage 335, comprising various data, which may be accessible, by program instructions 325. In an embodiment, program instructions 325 may include software elements of embodiments illustrated in the above figures. For example, program instructions 325 may be implemented in various embodiments using any desired programming language, scripting language, or combination of programming languages and/or scripting languages (e.g., C, C++, C#, Java™, JavaScript™, Perl, etc.). Data storage 335 may include data that may be used in these embodiments (e.g., recorded communications, profiles for different modes of operations, etc.). In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

FIG. 4 is a schematic flowchart diagram illustrating one embodiment of a method 400 for verifying presence of a person during an electronic visitation. In an embodiment, the visitation system 130 receives a request to initiate an electronic visitation session as shown at block 401. In such an embodiment, the request may be received from either an intelligent facility device 103 a telephone 106, 109, a device 105, 112, a laptop computer 113 or other suitable communication device. Accordingly, the request may be initiated by either a resident in the controlled-environment facility or a remote user.

In an embodiment, the visitation system 130 may instruct the user's device to capture an image of the user in response to the request as shown at block 402. To do so, the visitation system 130 may prompt the user to present his/her face for image capture. In a further embodiment, the visitation system 130 may instruct each users' device to capture an image, so that each user may be authenticated and authorized to participate in the electronic visitation. The captured image may include either a still frame photograph or a video image. A single video frame may be captured or a plurality of video frames may be recorded. The image may be captured by camera 114, webcam 205, image capture device 395, or the like, in various embodiments, inside or outside the controlled-environment facility, accordingly, and may be saved to a storage device, such as AMS database 115, data storage 335, and/or the like.

In an embodiment, a processor 310, such as of visitation system 130, may perform a face detection process at 403. As shown at block 403, a feature detection process may be performed on the captured image, such as to verify that images of features of a corporeal human face are present in the captured image, to thereby determine whether an image of a corporeal human face is present in the captured image. For example, a three-dimensional (3D) feature detection process, as illustrated, or the like, may be performed at 403 on the captured image to verify that an actual face is present in the image. Such a 3D feature detection process may identify three-dimensional characteristics of an image, including measurements of features of a face at a plurality of points on the image. In certain embodiments, changes in the measurements from frame to frame of a video image may indicate that the person is an actual person and not simply a photograph presented to trick the system. In still another embodiment, a plurality of still frame photograms may be captured and differences in measurements may be calculated to determine if the presented person is an actual person or a photograph. Hence, in accordance with embodiments of the present systems and methods, such face detection may be used alone, without the use of facial recognition. As described above, such a face detection process differs from a facial recognition process. Face detection may be a fast, less computational-intensive process, which may be performed by small local computer systems, such as intelligent facility device 103, nonresident devices 112, 113, or the like, without the need to necessarily access (outside) databases, more powerful computational resources, or the like, which may be necessary for (full) facial recognition.

In a further embodiment, the visitation system 130 may connect the requesting parties in an electronic visitation in response to a determination that an actual face was presented in the image as shown at block 404. That is, the electronic visitation session may be connected at 404 in response to a determination, at 403, that an image of a corporeal human face is present in the captured image, in accordance with various embodiments of the present systems and methods.

Assorted embodiments may call for performing a responsive action in answer to a determination at 403 that an image of a corporeal human face is not present in the captured image. Further embodiments may further include preforming a facial recognition process on the captured image, following performance of the feature detection process at 403 and/or in response to a determination that an image of a corporeal human face is present in the captured image at 403, such as to identify the user and/or to confirm an identity of the user. Additionally or alternatively, in response to a failure to verify that an image of a corporeal human face is present in the captured image, the processing device may be configured to perform a facial recognition process on the captured image, to identify the user and/or to confirm an identity of the user, such as in a situation where a video visitation system user has attempted to deceive the system, or the like.

FIG. 5 illustrates a different embodiment of a method 500 for verifying authorized persons during an electronic visitation. In this embodiment, the visitation system 130, for example, receives a request to initiate an electronic visitation session, such as a video visitation session, as shown at block 501. The visitation system 130 may then prompt the user to present his/her face for image capture as shown at block 502. For example, the visitation system 130 may play an audio prompt instruction the user to position his/her face in front of the camera. In an alternative embodiment, a video visitation device, such as intelligent facility device 103 or laptop 113 may display a textual prompt to the user. In still a further embodiment, an image capture guide, such as an oval overlaid on a video image, may be displayed to instruct the user regarding a position for presenting his/her face for image capture. The image capture device 395 may then capture an image or a series of images or video frames as shown at block 503.

Processor 310 of visitation system 130 may then perform a (3D) facial recognition process on the image(s) at 504, to affirmatively identify the user, rather than only performing a face detection process using feature detection, such as discussed above with respect to FIG. 4. This facial recognition process may be used to confirm that the user is an authorized user. For example, the visitation system 130 may verify that the resident present matches a PIN entered by the resident and that the remote user is a member of the resident's PAC list. If the face matches an authorized user as shown at block 505, then the visitation system 130 may connect the parties on an electronic visitation session as shown at block 506. For example, an electronic visitation session could include a telephone call, a video visitation, an instant message visitation, etc. If the faces don't match authorized persons, then the visitation session may be denied or disconnected as shown at block 509. In such embodiments, the captured images may be stored, as shown in block 510, in a data storage device, such as database 115, for further review.

If the visitation session is connected at block 506, then a second image of the users may be captured at a second time as shown at block 507. The second time may be at a predetermined time after connection of the visitation session. Alternatively, the second time may be randomly selected to avoid predictability. The second image may be processed according to the (3D) facial recognition process, and it may be further determined whether the face in the second image matches an authorized user as shown at block 508. If the face does not match an authorized user, then a responsive action may be taken. For example, the visitation session may be disconnected by visitation system 130 as shown at block 509. In such an embodiment, the second captured image may also be stored in a data storage device as shown at block 510. Additional responsive actions may include sounding an alert, generating a notification to the users and/or an administrator of the visitation system 130. Additionally, responsive action may include monitoring of the visitation session by a live agent, recording of the visitation session, etc. One of ordinary skill in the art may recognize additional responsive actions which may be taken.

FIG. 6 is a mockup diagram illustrating one embodiment of an apparatus for verifying presence of a person or authorized persons during an electronic visitation during use. This embodiment may also further demonstrate methods 400 and 500 described in FIGS. 4 and 5. In this embodiment, the method is carried out, at least in part, by an intelligent facility device 103. When a resident attempts to participate in an electronic visitation session, the intelligent facility device activates the webcam 205 and requires that the resident show his/her face 601. During the use of the electronic visitation session, the visitation system 130 may monitor webcam 205 to ensure that the actual face 601 of the (authorized) person is still present, for example, while interacting with content 602 on intelligent facility device 103. If the monitoring application no longer detects an actual (authorized) face 601 within camera field of view 603, the existing login session and display information may be closed.

This solution may utilizes the integrated webcam 205 of a resident intelligent facility device 103 and utilizes algorithms for detecting (3D) facial features to verify that a human face is presented to the camera 205. In such an embodiment, face detection may be required before and after logging into select functions. While logged into one or more select functions, the resident may maintain their face 601 within the view of the webcam 205.

In a further embodiment, a small window may be presented, into which is displayed the image being captured by the webcam 205 to assist the resident in properly placing their face in view of the webcam 205.

In still a further embodiment, facial identification processes may be performed. Within this variation, not only may face detection be employed, but the face may be matched against a known likeness of the resident, non-resident, or others, such as known associates of the resident, or the like, using a facial recognition process. A match to the known face of the resident may act not only as a means of maintaining the electronic visitation session, but also as an additional level of confirmation of the resident's identity so as to preclude unauthorized use.

FIG. 7 illustrates a mockup of a captured image 700. As illustrated, the captured image 700 may include a face 601 of a user. In a further embodiment, the image may include a second face on a second person 703 in the background 702 of the image 700. In an embodiment, the visitation system 130 may perform facial recognition on any faces present in the image 700 to ensure that all parties to the visitation are authorized to participate and to ensure that no other residents are eavesdropping on the electronic visitation session.

FIG. 8 is a flowchart of another embodiment of a process (800) for verifying presence of a person and/or authorized persons during an electronic visitation. Therein, images of residents of a controlled-environment facility are captured at 801, such as at the time of intake or registration of the residents into the controlled-environment facility, for example during booking at a jail, or the like. A feature detection process may be performed at 802 on each of the images of each of the residents to verify that face detection-useable and/or facial recognition-usable images of corporeal facial features are present in each of the images of each the residents. That is, a feature detection process may be performed at 802 on each image to identify images where corporeal facial features are present for each the residents. Whereupon, at 803, a copy of at least one image of each resident in which face detection-useable and/or facial recognition-usable images of corporeal facial features are present may be stored to a data storage device, in response to verification at 802 that images of corporeal facial features were present.

Thereafter, in accordance with some embodiments, a request to initiate an electronic visitation session by a user may be received at 804 and user identification information may be received from the user at 805. Thereupon, an image may be captured at 806, with an image capture device, of the user to provide a captured user image in response to the request. A face detection process and/or a facial recognition process may be performed on the captured user image to identify the user at 807, such as the party identified at 805.

In accordance with some embodiments, this user may be a resident of the controlled-environment facility. In such embodiments a saved copy of an image of the resident saved at 803 in response to verification at 802 that images of corporeal facial features were present at the time of intake or registration may be used in performing a facial recognition process on the captured user image to identify the resident at 807, for example as the party identified at 805.

In some additional or alternative embodiments, the user may be a non-resident of the controlled-environment facility. In some such embodiments, an image of the non-resident may be captured at 806 to provide a captured image of the non-resident, whereupon a feature detection process may be performed on the captured image of the non-resident at 808 to verify that images of features of a corporeal human face are present in the captured image so as to determine whether an image of a corporeal human face is present in the captured image of the non-resident. Additionally or alternatively, a facial recognition process may be performed on the captured image of the non-resident at 807 to identify the non-resident. For example, a facial recognition process at 807 may be carried out on the captured image, following performance of the feature detection process at 808 and/or in response to a determination that an image of a corporeal human face is present in the captured image at 808, such as to identify the user and/or to confirm an identity of the user, such as the party identified at 805.

Various embodiments may call for performing a responsive action in response to a determination at 808 that an image of a corporeal human face is not present in the image captured at 806 and/or as a result of recognition of a face at 807 other than the party identified at 805.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
    receiving a request to initiate an electronic visitation session;
    capturing an image, with an image capture device, of a user to provide a captured image in response to the request;
    performing a feature detection process, with a processor, on the captured image to verify that images of features of a corporeal human face are present in the captured image to determine whether an image of a corporeal human face is present in the captured image; and
    connecting the electronic visitation session in response to a determination that an image of a corporeal human face is present in the captured image.

2. The method of claim 1, further comprising prompting the user to face the image capture device in response to receiving the request.

3. The method of claim 1, wherein the image capture device is configured to capture a still-frame image and/or a video frame to provide the captured image of the user.

4. The method of claim 1, further comprising preforming a facial recognition process on the captured image, following performance of the feature detection process and/or in response to a determination that an image of a corporeal human face is present in the captured image, to identify the user and/or to confirm an identity of the user.

5. The method of claim 1, further comprising storing the captured image in a data storage device.

6. The method of claim 1, wherein the image capture device comprises a component of a video visitation system located within a controlled-environment facility.

7. The method of claim 1, wherein the image capture device comprises a component of an electronic device located outside of the controlled-environment facility.

8. The method of claim 1, further comprising performing a responsive action in response to a determination that an image of a corporeal human face is not present in the captured image.

9. The method of claim 1, wherein the feature detection process utilizes three-dimensional (3D) feature detection process.

10. A video visitation apparatus comprising:
    an image capture device configured to capture an image of a user, to provide a captured image of the user, in response to a request to initiate an electronic visitation session;
    a processing device coupled to the image capture device and configured to:
        perform a feature detection process on the captured image to detect images of corporeal human face features present in the captured image to verify that an image of a corporeal human face is present in the captured image; and
        connect the electronic visitation session in response to verification that an image of a corporeal human face is present in the captured image.

11. The apparatus of claim 10, wherein the processing device is further configured to prompt the user to face the image capture device in response to receiving the request.

12. The apparatus of claim 10, wherein the image capture device is further configured to capture a still-frame image and/or a video frame to provide the captured image of the user.

13. The apparatus of claim 10, wherein the processing device is further configured to perform a facial recognition process on the captured image following performance of the feature detection process and/or in response to a failure to verify that an image of a corporeal human face is present in the captured image to identify the user and/or to confirm an identity of the user.

14. The apparatus of claim 10, wherein the processing device is further configured to store the captured image in a data storage device.

15. The apparatus of claim 10, wherein the image capture device comprises a component of a video visitation system located within a controlled-environment facility.

16. The apparatus of claim 10, wherein the image capture device comprises a component of an electronic device located outside of the controlled-environment facility.

17. The apparatus of claim 10, wherein the processing device initiates a responsive action in response to a failure to verify that an image of a corporeal human face is present in the captured image.

18. The apparatus of claim 10, wherein the processing device may utilize a three-dimensional (3D) feature detection process to carry out the feature detection process.

19. A computer readable non-transitory medium having program instructions stored thereon that upon execution by one or more computer systems, cause the one or more computer systems to:
receive a request to initiate an electronic visitation session;
capture an image of a user to provide a captured image in response to the request;
perform a feature detection process on the captured image to verify that images of features of a corporeal human face are present in the captured image to determine whether an image of a corporeal human face is present in the captured image; and
connect the electronic visitation session in response to a determination that an image of a corporeal human face is present in the captured image.

20. The computer readable non-transitory medium of claim 19, wherein the program instructions, upon execution by the one or more computer systems, cause the one or more computer systems to prompt the user to face the image capture device in response to receipt of the request.

21. The computer readable non-transitory medium of claim 19, wherein the program instructions, upon execution by the one or more computer systems, cause the one or more computer systems to capture a still-frame image and/or a video frame to provide the captured image of the user.

22. The computer readable non-transitory medium of claim 19, wherein the program instructions, upon execution by the one or more computer systems, cause the one or more computer systems to perform a facial recognition process on the captured image, following performance of the feature detection process and/or in response to a determination that an image of a corporeal human face is present in the captured image, to identify the user and/or to confirm an identity of the user.

23. The computer readable non-transitory medium of claim 19, wherein the program instructions, upon execution by the one or more computer systems, cause the one or more computer systems to store the captured image in a data storage device.

24. The computer readable non-transitory medium of claim 19, wherein the program instructions, upon execution by the one or more computer systems, cause a component of a video visitation system located within a controlled-environment facility to capture the image of the user.

25. The computer readable non-transitory medium of claim 19, wherein the program instructions, upon execution by the one or more computer systems, cause a component of an electronic device located outside of the controlled-environment facility to capture the image of the user.

26. The computer readable non-transitory medium of claim 19, wherein the program instructions, upon execution by the one or more computer systems, cause the one or more computer systems to perform a responsive action in response to a determination that an image of a corporeal human face is not present in the captured image.

27. The computer readable non-transitory medium of claim 19, wherein the feature detection process utilizes three-dimensional (3D) feature detection process.

* * * * *